United States Patent Office 3,446,025
Patented May 27, 1969

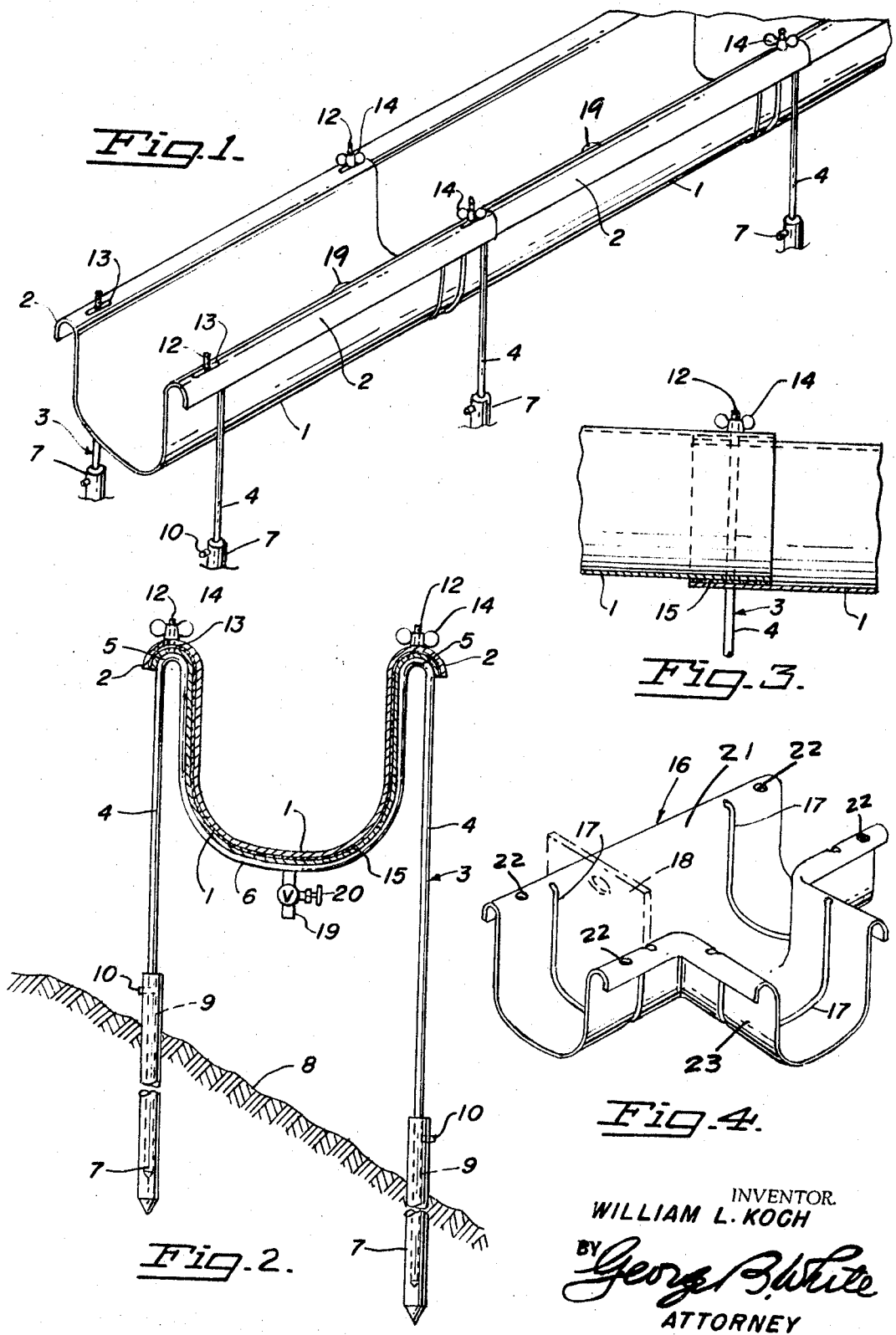

---

3,446,025
FLUID DISTRIBUTION MEANS
William L. Koch, San Francisco, Calif., assignor to H. Koch & Sons Inc., Corte Madera, Calif., a corporation of California
Filed Nov. 2, 1967, Ser. No. 680,101
Int. Cl. E02b 5/00
U.S. Cl. 61—14                  7 Claims

---

ABSTRACT OF THE DISCLOSURE

Flume elements, each consisting of a length of plastic material, preferably fiber glass reinforced plastic, having a trough-like cross-section with outwardly curved flanges along the free edges thereof, and a plurality of spaced supports, each being formed in a shape to fit into the opposite curved flanges and snugly fit around the exterior contour of the trough-like flume, and having a pair of legs respectively beneath the opposite flanges; and means engageable with the ground to adjustably hold said legs thereby to support the flume at a selected height above the ground. The ends of the flumes overlap at said supports and a non-hardening sealant layer is provided between the superimposed ends.

---

BRIEF DESCRIPTION OF THE INVENTION

Fluid distribution elements, for instance flumes of this invention are light so that they can be easily handled by one person; each flume is shaped in trough-like cross-section to conduct the supply of water and the flumes are supported at spaced points, preferably near the opposite ends thereof, at selected height from the ground thereby to provide for proper incline for the flow of water and in some places to also provide access to the ground beneath the flumes or aqueducts; the adjacent ends of the trough-like elements fit into one another and are provided with a non-hardening mastic sealant between the superimposed ends which prevents the escape of water, yet it permits quick separation; the spaced supports snugly nestle the overlapping ends of the trough-like elements and quick releasable fastening means secure the overlapping ends of the flumes to the supports, the supports being adjustable to space the aqueducts at selected attitudes above the ground.

DESCRIPTION OF FIGURES

FIG. 1 is a perspective view of the flumes assembled and supported on spaced standards.

FIG. 2 is a cross-sectional view of the assembled flumes on said standards.

FIG. 3 is a fragmental sectional view of the overlapping ends of the flumes.

FIG. 4 is a perspective view of a T flume connecting element.

DETAILED DESCRIPTION OF THE INVENTION

Each flume 1 is of trough-like cross-section and has a flange 2 along each free edge thereof. Each flange 2 is of substantially semi-circular cross-section inverted to face to the trough-like shape of the flume 1. Each flume element is made of glass fiber reinforced plastic so as to be light but rigid. The longitudinal flanges 2 lend rigidity to each flume element 1.

Each standard for supporting the flume consists of a single rod 3 bent so as to form parallel legs 4, the tops 5 of the legs 4 are curved in semi-circular shape, and the connecting portion between the tops is bent into a cradle 6 conforming to the trough-like shape of the flume 1, so as to snugly fit the exterior contour of the flume 1.

Tubular spikes 7 are driven into the ground 8, spaced apart to register with the respective legs 4 so that the latter can be inserted into the passages 9 in the respective spikes 7 and securely fastened therein in selected adjusted position by suitable fastening means such as set screws 10. From each support top 5 extends a threaded pin 12. The flumes are provided near their ends with slots 13 which can be inserted over the respective pins 12. Suitable nuts such as wing nuts 14 on each pin 12 securely fasten the adjacent ends of the flume elements to the tops 5 of the standards.

The ends of the flume elements 1 nest into one another and overlap as shown in the drawings. Between the superimposed ends of adjacent flume elements 1 is a layer of sealant 15 such as mastic of the kind which does not harden but seals the overlap.

Flume elements are made also in T shape connections or L shape connections for diversions or turns or outlets in the aqueduct, for instance, as shown in FIG. 3. In the T connection 16 a gate is needed and for this purpose grooves 17 are formed along the interior contour of each branch of the T connection to tightly hold a gate 18 inserted therein.

In operation the entire aqueduct may be laid out very quickly. The tubular spikes 7 are driven into the ground at spaced intervals and the flume elements 1 are placed on them. Either before or after the flume elements are placed on the standards 3, the legs 4 are adjusted and secured for the selected height. In the event of slanting ground as shown in FIG. 2, one leg 4 is adjusted to be shorter than the other leg 4 so as to compensate for the incline and to support the flume element 1 horizontally. The standards 3 are so spaced as to provide for the overlapping of the ends of adjacent flume elements 1. The mastic layer 15 is applied to the overlapping end of the outer flume as it is cradled in the standard cradle 6. Then the overlapping end of the adjacent flume element 1 is placed on the mastic layer 15, and the securing elements such as the wing nuts 14 are tightened.

The slots 13 in the ends of the flume elements 1 are elongated longitudinally of the flume element 1, for allowing limited play for overlapping adjustment and also to provide for the expansion and contraction due to changes of temperature. In this manner an entire aqueduct could be assembled quickly and efficiently and sufficiently high above the ground not to interfere with cultivation, and thereby eliminate loss of water by percolation through the soil and obviate the necessity for irrigation ditches of the type in use at present.

The T connection 16 herein is used at intervals as an outlet for flood irrigation, by manipulation of the respective gates 18 to direct the water flow out at the selected T connection. For row irrigation outlets 18, controlled by valves 19, are provided spaced apart to conform to the rows to be irrigated.

The head portion 21 of said T connection is of the same cross-sectional contour as the flume elements and has the holes 22 for securing over the pins 12 in overlapping relation of the adjacent ends of flume elements at each end of the head portion 21, in the same manner as overlapping ends of the flume elements. The middle or leg portion 23 of the T connection serves as the outlet through which the water is released when the respective gates 18 are raised.

I claim:
1. Fluid distribution means comprising:
 (a) individual flume elements,
 (b) each element having trough-like cross-section with an inverted channel formed along its longitudinal edges,
 (c) spaced supports for said flume elements,
 (d) each support having a cradle top for nesting said flume elements,
 (e) adjustable means to support said supports at se- lected height above the ground in suitable attitude to conduct water, (f) a securing extension extended from said cradle top, (g) each of said flume elements having elongated slots fitting upon said securing extensions for holding the flume elements in place with limited freedom of longitudinal movement.

2. The invention defined in claim 1, and (h) the adjacent ends of said flume elements being overlapping and superimposed on one another with said elongated slots in said ends being in substantial registry, (i) and a sealant between said overlapping ends, (j) said flume elements being made of fiberglass reinforced plastic and said sealant being a non-hardening mastic.

3. Fluid distribution means comprising, (a) individual flume elements, (b) each element having trough-like cross-section with an inverted channel formed along its longitudinal edges, (c) spaced supports for said flume elements, (d) each support having a cradle top for nesting said flume elements, (e) adjustable means to support said supports at selected height above the ground in suitable attitude to conduct water, (f) a pair of legs extended from said cradle top, (g) tubular spikes insertable in the ground into which said legs are insertable, (h) and means to hold said legs in adjusted position in said tubular spikes.

4. The invention defined in claim 3, and (f) spaced outlets on said flumes for releasing water therefrom, (g) and means to control said outlets.

5. The invention defined in claim 3, and (f) an outlet connection of the same cross-sectional contour as said flume element and being adapted to be secured to an end of said flume element, (g) said outlet connection having a portion forming an open outlet, (h) and flow control gates in said outlet connection.

6. Fluid distribution means comprising, (a) individual flume elements, (b) each element having trough-like cross-section with an inverted channel formed along its longitudinal edges, (c) spaced supports for said flume elements, (d) each support having a cradle top for nesting said flume elements, (e) adjustable means to support said supports at selected height above the ground in suitable attitude to conduct water, (f) said cradle top conforming substantially to the exterior contour of the flume elements, (g) said adjustable means including spaced legs extended from said cradle top, (h) tubular spikes adapted to be driven in the ground and said legs being insertable in said subular spikes, (i) and means to hold said legs in said spikes in adjusted position.

7. The invention defined in claim 6 and (j) the longitudinal channels of the flume elements having elongated slots on portions overlying the adjacent cradle tops, (k) and securing means extended through the respective slots to hold said flume elements on said cradle tops.

References Cited

UNITED STATES PATENTS

| | | | |
|---|---|---|---|
| 315,629 | 4/1885 | Jessup | 61—15 X |
| 346,920 | 8/1886 | Jessup | 61—15 X |
| 1,055,426 | 3/1913 | Smith | 61—15 |
| 2,647,476 | 8/1953 | Gibbons | 61—15 |
| 3,024,614 | 3/1962 | La Rue | 61—12 X |
| 3,156,099 | 10/1964 | Dailey | 61—12 X |
| 1,078,835 | 11/1913 | Craig | 61—14 |

FOREIGN PATENTS 841,369   7/1960   Canada.

EARL J. WITMER, *Primary Examiner.*